(12) United States Patent
Hill et al.

(10) Patent No.: US 8,887,114 B2
(45) Date of Patent: Nov. 11, 2014

(54) AUTOMATIC TAP DRIVER GENERATION IN A HYBRID CLOCK DISTRIBUTION SYSTEM

(71) Applicant: Synopsys, Inc., Mountain View, CA (US)

(72) Inventors: Dwight Hill, Mountain View, CA (US); Dennis Ding, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/802,012

(22) Filed: Mar. 13, 2013

(65) Prior Publication Data

US 2014/0282339 A1    Sep. 18, 2014

(51) Int. Cl.
*G06F 9/455*    (2006.01)
*G06F 17/50*    (2006.01)

(52) U.S. Cl.
CPC ............................... *G06F 17/5072* (2013.01)
USPC ............................. 716/113; 716/122; 716/134

(58) Field of Classification Search
CPC ............ G06F 17/5031; G06F 17/5036; G06F 17/5072; G06F 17/5068; G06F 17/505
USPC ........................................ 716/113, 122, 134
See application file for complete search history.

(56) References Cited

U.S. PATENT DOCUMENTS

| | | | |
|---|---|---|---|
| 6,536,024 B1 * | 3/2003 | Hathaway | 327/295 |
| 8,205,182 B1 * | 6/2012 | Zlatanovici et al. | 716/125 |
| 8,384,436 B2 * | 2/2013 | Peng | 326/93 |
| 2003/0135836 A1 * | 7/2003 | Chang et al. | 716/11 |
| 2010/0235802 A1 * | 9/2010 | Singasani | 716/12 |
| 2012/0176157 A1 * | 7/2012 | Peng | 326/93 |
| 2013/0042215 A1 * | 2/2013 | Tian et al. | 716/104 |
| 2013/0061193 A1 * | 3/2013 | Lasher et al. | 716/114 |
| 2013/0174104 A1 * | 7/2013 | Vishweshwara et al. | 716/54 |
| 2013/0219352 A1 * | 8/2013 | Ishikawa et al. | 716/108 |

* cited by examiner

*Primary Examiner* — Suresh Memula

(74) *Attorney, Agent, or Firm* — Fenwick & West LLP

(57) ABSTRACT

A hybrid clock distribution system uses a distribution fabric to distribute clock signals across longer physical distances and local sub-distribution networks to distribute clock signals more locally and to implement logic functions such as clock gating. A set of tap drivers connect the distribution fabric to the sub-distribution networks. A design tool automatically generates and places the set of tap drivers.

44 Claims, 9 Drawing Sheets

AUTOMATIC TAP DRIVER GENERATION IN A HYBRID CLOCK DISTRIBUTION SYSTEM

BACKGROUND OF THE INVENTION

1. Field of the Invention

This invention relates to generating a clock distribution system for the distribution of clock signals in an integrated circuit design.

2. Description of the Related Art

Clocks are a basic component of circuit designs. It is common for a single clock source (often referred to as the clock root or root) to drive many clock loads (often referred to as clock sinks or sinks). Some sort of clock distribution system is used to distribute clock signals from the root to the sinks. The clock signals may undergo logic operations so that the clock signals received by the sinks may not be exact copies of the clock signal transmitted by the root. For example, clock gating is a common type of logic operation applied to clock signals. Thus, the clock distribution system typically includes logic in addition to some mechanism for distributing the clock signals to different locations.

It is typically desirable for the clock distribution system to exhibit low skew. In most cases, it is desirable for clock signals to reach their respective sinks with the same delay. Furthermore, current circuit designs are often expected to operate correctly across many corners, modes and in the presence of on-chip variations. Corners refers to variations in process, voltage, or temperature that may affect the operation of a circuit. Modes refers to different modes of operation for a circuit, for example startup mode, regular mode, low power mode, sleep mode, etc. On-chip variations refers to variations across an integrated circuit. Due to on-chip variations, the same nominal circuit at two different locations on an integrated circuit may vary in its behavior. Preferably, the low skew condition would hold for all corners, modes and in the presence of on-chip variations.

One type of clock distribution system is a tree. A tree starts at the clock root and then branches and branches and branches until it reaches all of the sinks. The branches and branching points may contain logic, and it is relatively easy to implement any required logic if the clock distribution system is architected as a tree. However, it can be difficult to achieve low skew across the entire tree, especially across all corners, modes and in the presence of on-chip variations. This is especially true if the tree spans a large physical distance so that sinks are placed far apart. The conditions at one end of the tree may be significantly different from those at the other end, in which case the tree may no longer achieve low skew.

Another type of clock distribution system is a mesh. A mesh typically is a grid of conductors. The root drives a set of parallel drivers, which in turn drive the mesh. The mesh then drives the sinks. Ideally, the impedance between different points on the mesh is low enough that on-chip variations are somewhat averaged out across the mesh. However, a mesh that directly drives all sinks can take up significant area and require significant power to drive. It can also be difficult to implement logic in a mesh.

Thus, there is a need for improved clock distribution systems.

SUMMARY

A hybrid clock distribution system uses a distribution fabric to distribute clock signals across longer physical distances and local sub-distribution networks to distribute clock signals more locally and to implement logic functions such as clock gating. A set of tap drivers connect the distribution fabric to the sub-distribution networks. A design tool automatically generates and places the set of tap drivers.

In one example, the hybrid clock distribution system is a multisource clock tree. The distribution fabric is a clock mesh and the sub-distribution networks are clock trees, which will be referred to as clock sub-trees. In one embodiment, the set of tap drivers is generated and placed based on the placement of the sinks. The sinks are clustered and the tap drivers placed based on the clusters. For example, tap drivers may be generated based on the locations of the clusters that they are likely to drive. The sub-trees for individual clusters may be designed by temporarily replacing the tap driver by a clock source and then treating the clock source plus sub-tree as a conventional clock tree optimization problem.

In order to synthesize an effective set of tap drivers, it is desirable to evaluate the effectiveness of a candidate tap configuration. In one embodiment, a design tool generates candidate solutions for driver tap placements, and then applies some clock tree synthesis engine metrics to evaluate the quality of results (e.g. latency, area, power, etc.) to estimate the suitability of the tap configuration. The tap configuration can be improved by iteration until it is acceptable. The design of the tap configuration preferably is also subject to user constraints, for example constraints on number of taps, area, power or timing.

Other aspects of the invention include devices, systems, applications, computer readable medium and other variations and technologies related to those described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The following detailed description of embodiments of the invention make reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
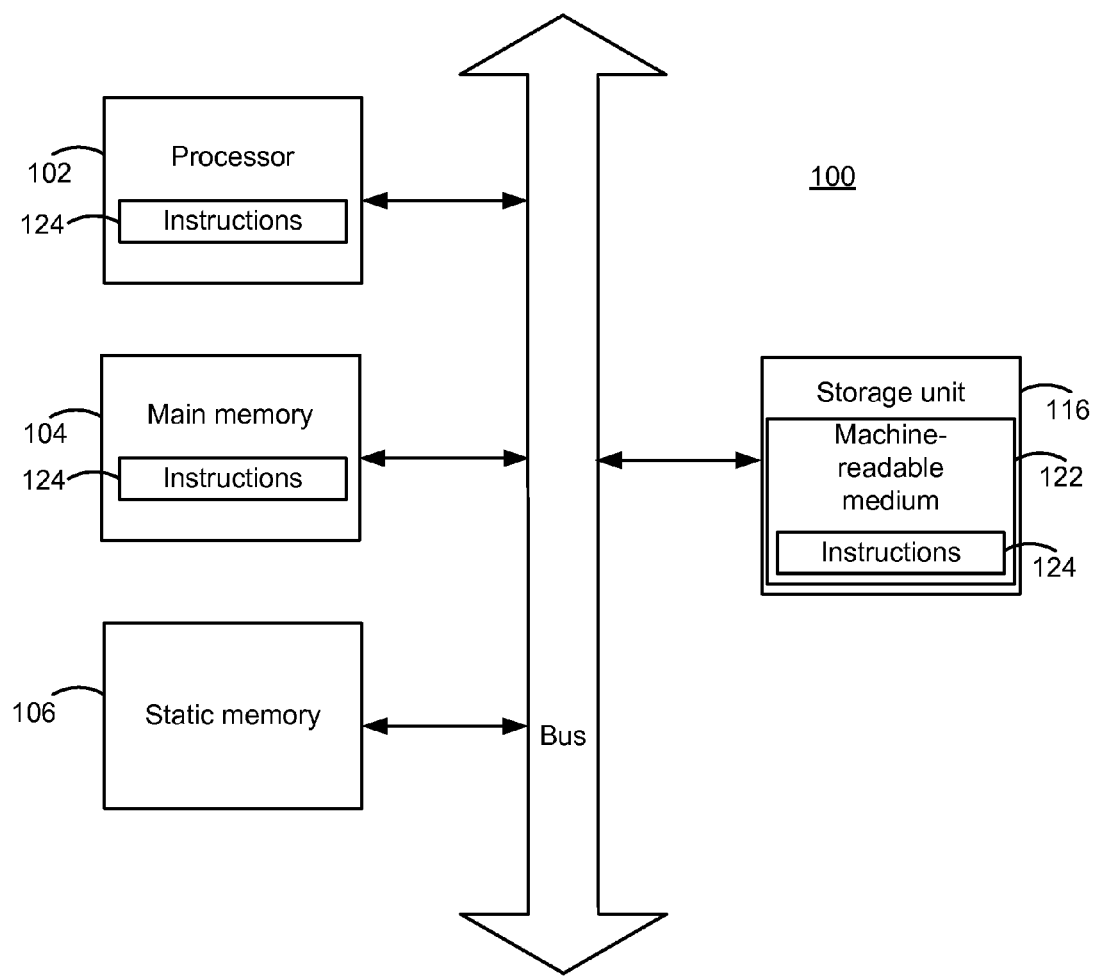
FIG. 1 illustrates one embodiment of components of an example computer system able to read instructions from a machine-readable medium and execute them in a processor (or controller).

FIG. 1 is a block diagram illustrating components of an example computer system able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), a main memory 104, a static memory 106, and a storage unit 116 which are configured to communicate with each other via a bus 108. The storage unit 116 includes a machine-readable medium 122 on which are stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Figure 2:
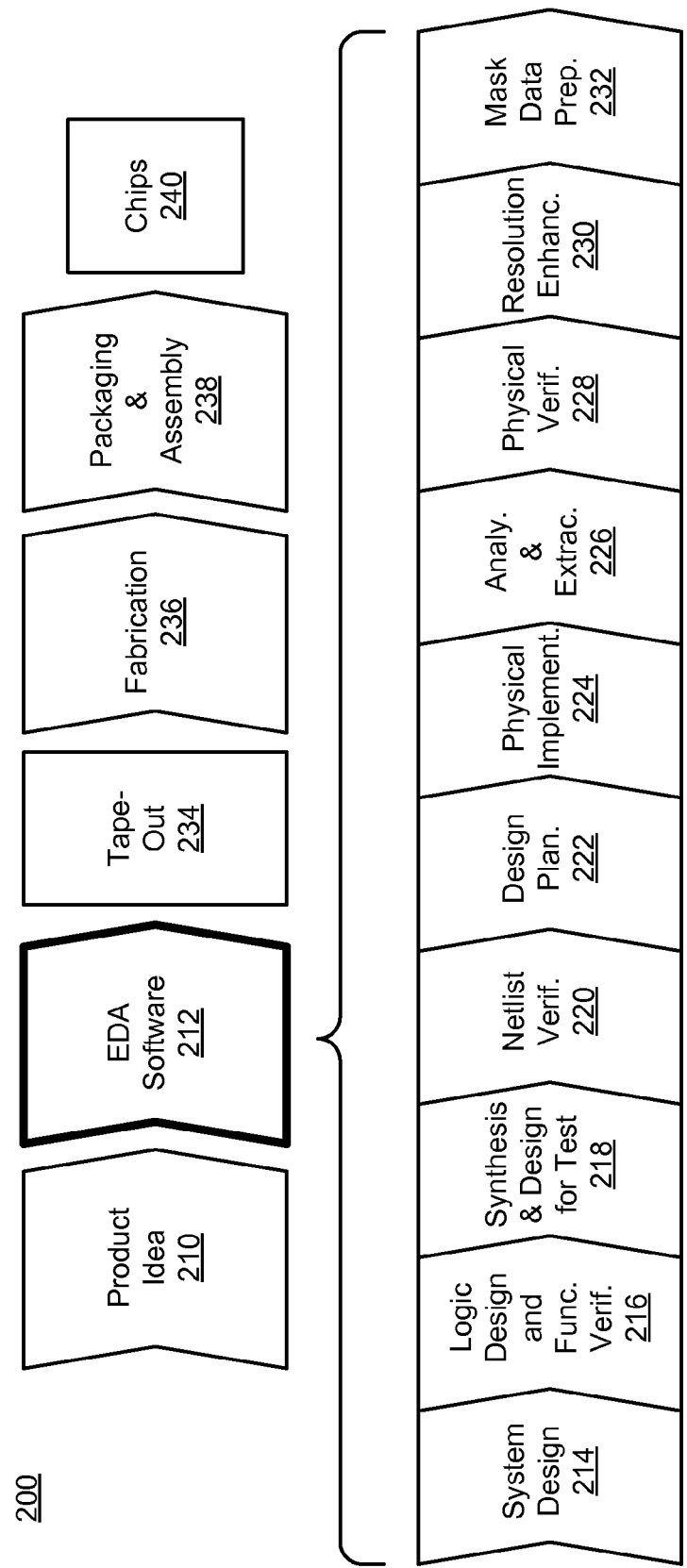
FIG. 2 is one embodiment of a flowchart illustrating various operations in the design and fabrication of an integrated circuit.

FIG. 2 is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished integrated circuits (or chips) 240.

The EDA software 212 may be implemented in one or more computing devices such as the computer system 100 of FIG. 1. For example, the EDA software 212 is stored as instructions in the computer-readable medium which are executed by a processor for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein. In addition, not all of the design operations need be performed and/or additional design operations may be performed.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 216, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 218, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. The synthesis 218 and physical implementation 224 stages are often closely related. Example EDA software products from Synopsys, Inc. of Mountain View, Calif. that can be used at this stage 224 include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments the present disclosure can be used in EDA software 212 that includes operations from synthesis 218 and physical implementation 224.

Figure 3:
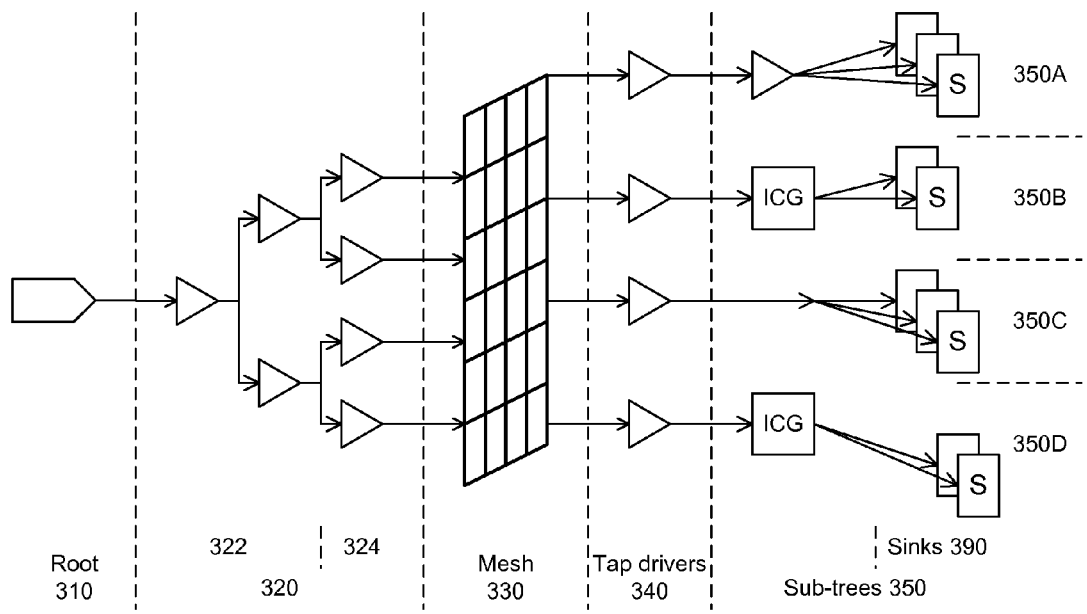
FIG. 3 is a diagram of one embodiment of a multisource clock system, which may be designed with the present invention.

FIG. 3 is a diagram of one embodiment of a multisource clock system, which may be designed with the present invention. The clock root 310 provides the original clock signal, which is to be distributed to a large number of clock sinks 390, labeled S in FIG. 3. The distribution is achieved by a distribution fabric 330 and a number of sub-distribution networks 350A-D. In this particular example, the distribution fabric 330 is implemented as a mesh fabric and the sub-distribution networks 350 are implemented as trees. These trees 350 may be referred to as sub-trees because each sub-tree feeds only a portion of the total number of sinks 390. The mesh fabric 330 provides clock distribution over a longer physical distance, while the sub-trees 350 typically provide localized clock distribution. As a result, the sub-trees may be unbalanced trees. In addition, the sub-trees may include logic functions, such as clock gating.

In more detail, the mesh fabric 330 is driven by the clock root 310 via a pre-mesh network 320. There is a pre-mesh clock tree 322, which distributes the clock to multiple points. The output of that tree 322 is fed into mesh drivers 324, which distribute the clock signal to and drive the mesh fabric 330. The mesh fabric 330 is tapped at various points by drivers 340, which then drive the individual sub-trees 350. For convenience, these drivers 340 will be referred to as tap drivers or multisource drivers. The placement of the tap drivers 340 and the location of the tap points on mesh 330 (i.e., where the tap drivers 340 attach to mesh 330) are selected automatically. The corresponding set of tap drivers 340 is also generated and incorporated into the circuit design automatically, as can be achieved by current practice if given a specification for their number and locations. The tap points, through the multisource drivers 340, feed the sub-trees 350. The sub-trees may include integrated clock gating (ICG) cells, as shown for sub-trees 350B and 350D. The sub-trees 350 may have additional logic and may be several layers deep. In one embodiment, the sub-trees 350 are 3-9 gate levels deep. The tap drivers 340 may drive additional drivers in the sub-tree, as shown for sub-tree 350A.

The example clock distribution system shown in FIG. 3 will be used for illustration, but the invention is not limited to this example. The multisource clock tree shown in FIG. 1 is just one example of a hybrid clock distribution system that combines a distribution fabric driving multiple sub-distribution networks. The distribution fabric provides clock distribution over a longer physical distance, while the sub-distribution networks typically provide localized distribution and allow for logic operations.

In FIG. 1, the distribution fabric is a mesh fabric 330. A mesh fabric is a grid of conductors driven in parallel by a set of drivers (the mesh drivers 324 in FIG. 1). The grid structure results in low impedance between the different mesh drivers 324, thus reducing the effects of on-chip variations. Another type of distribution fabric is based on low resistance conductors driven by wide drivers. In this context, low resistance conductors are usually wires that are several times the minimum width and that are placed on higher metal layers of the IC fabrication assembly. In common practice, such higher metal layers are thicker and are commonly used to carry power or ground. A distribution fabric may also be constructed using specially designed balanced trees, where each branch of the tree follows the same sequence of layers and distances, such as Metal8 for 50 microns, then Metal7 for 30 microns, then Metal8 again for 20 microns, etc. This type of balanced tree may be effective for distributing clock signals over long distances while retaining its low-skew characteristic even if the process varies from one run to another. For example, if all paths through the tree have a the same total amount of Metal7 in them, then a change in the thickness of Metal7 would affect all paths equally.

Since the distribution fabric distributes clock signals over a longer physical distance, it is designed to reduce the effects of on-chip variations. On-chip variations typically can be characterized by some "characteristic distance." Locations that are separated by less than the characteristic distance will have more correlated variations while locations that are farther apart than the characteristic distance will have less correlated variations. Thus, two buffers close to each other will have more similar propagation delays while two buffers that are farther apart may have more different propagation delays due to on-chip variations (e.g., process variations). A distribution fabric typically is designed to distribute a clock signal over a distance that is greater than the characteristic distance. As such, it is typically designed so that the on-chip variations do not cause too much unwanted skew. In a current technology, where the wire widths are on the order of 28 nanometers, the clocks typically may be distributed over distances of 1000 microns or more. In contrast, the on-chip variations are characterized by correlation distances that generally are much smaller than 200 microns.

In contrast, the sub-distribution network is designed to provide local distribution and to facilitate logic operations. In FIG. 3, the sub-distribution network is a sub-tree 350. On-chip variation is less of an issue for the sub-trees because each sub-tree 350 represents only a fraction of the overall latency from the root to the sinks. That is, if 70% of the latency is from the root to the mesh and 30% from the mesh to the sinks, then the effect of on-chip variations on latency is reduced by 70%.

The multisource clock tree shown in FIG. 3 is a hybrid clock distribution system because it combines a distribution fabric with sub-distribution networks that have logic. It is not a pure clock mesh, nor is it a pure clock tree. Rather, it uses a low skew clock fabric to distribute the clock over longer distances, and then taps into the clock fabric at a limited number of tap locations. At each tap, there may be a very small number of sinks, or a larger number up to a medium size clock tree, but still typically much smaller than the original clock tree.

Figure 4A:
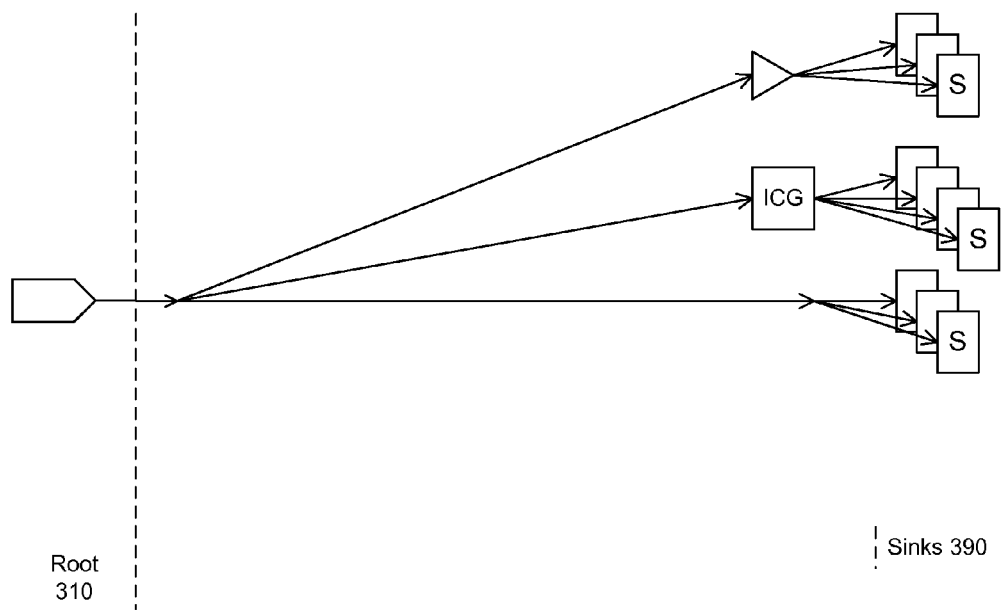
FIGS. 4A-4E illustrate one approach of generating a set of tap drivers for the multisource clock system of FIG. 3.

FIGS. 4A-4E illustrate one approach to generating the multisource clock system of FIG. 3. In FIG. 4A, a clock root 310 drives a large number of clock sinks 390. In this initial phase, the clock distribution system begins as a tree that branches out from the root 310 to the sinks 390.

Figure 4B:
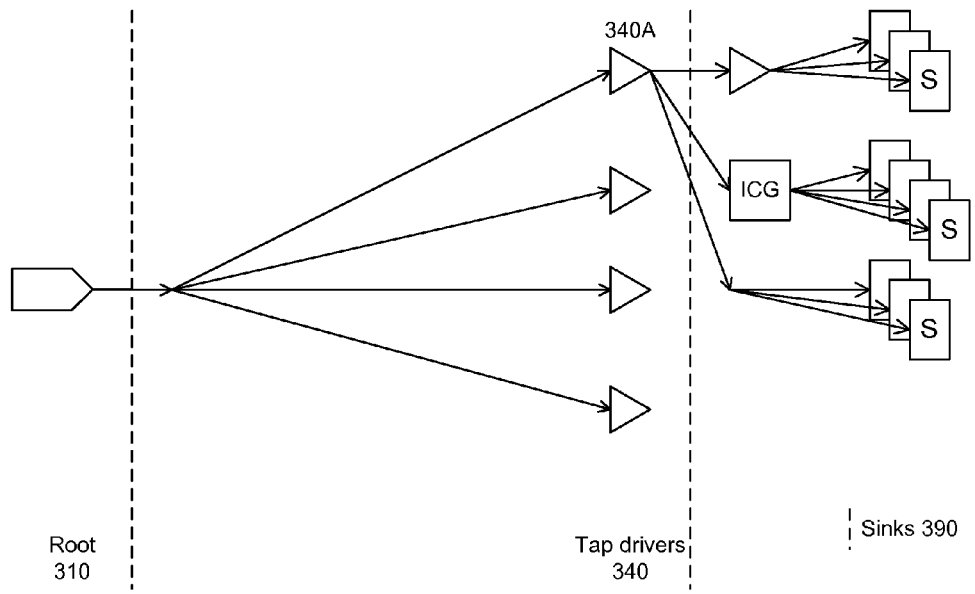

In FIG. 4B, a set of tap drivers are placed, as will be described in greater detail in FIG. 5. In one approach, the tap drivers are placed randomly or semi-randomly (i.e., randomly but taking into account certain objectives and/or constraints). The clock distribution system is modified so that the root 310 drives the tap drivers 340. The sinks 390 are all assigned to a single tap driver 340A, as shown in FIG. 4B.

Figure 4C:
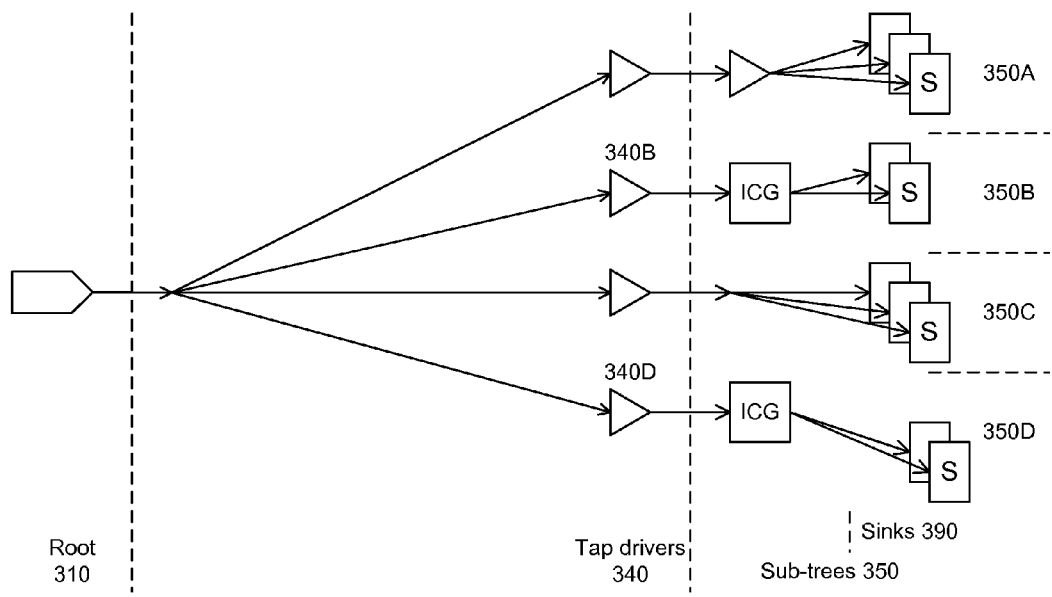

In FIG. 4C, the clock tree from tap driver 340A (which connects to all of the sinks) is divided into sub-trees 350A-D.

The sub-trees 350 are assigned to tap drivers 340. In FIG. 4C, sub-tree 350A is assigned to tap driver 340A, sub-tree 350B to tap driver 340B, etc. As part of this process, gates or other parts of a sub-tree may be cloned or split. In FIG. 4B, the ICG drives four sinks. In FIG. 4C, these four sinks are allocated to two different sub-trees 350B and 350D, with corresponding tap drivers 340B and 340D. Accordingly, the ICG has been cloned.

Figure 4D:
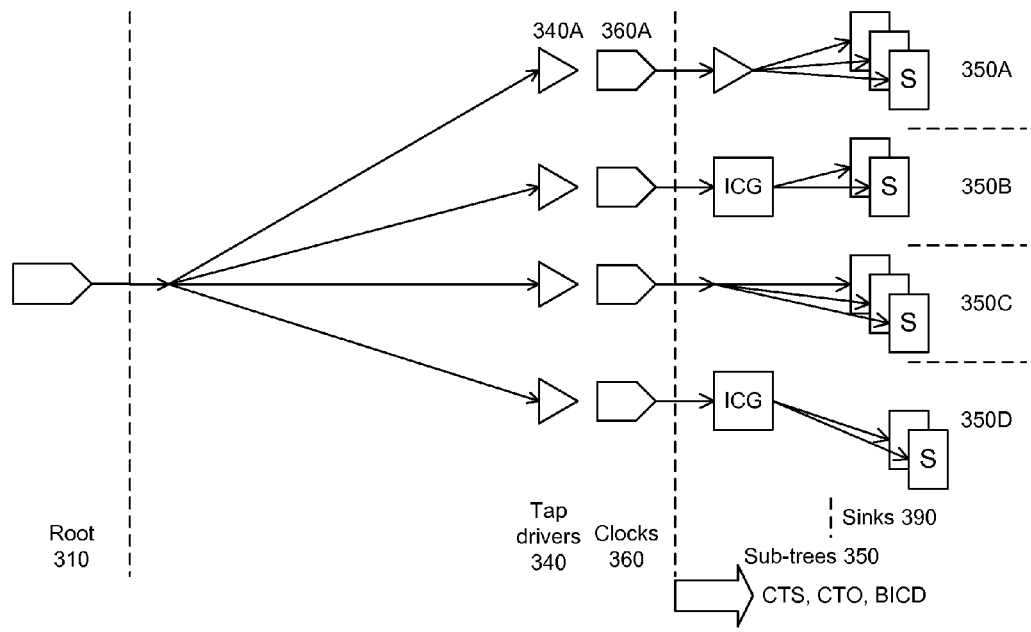

In FIG. 4D, the sub-trees 350 are optimized, as may be done according to current practice. Each sub-tree 350 may be treated as a separate tree and conventional clock tree synthesis (CTS) and clock tree optimization (CTO) techniques applied to the sub-tree. The delays among the sub trees may be balanced with a Balance Inter Clock Delay (BICD) operation. For example, tap driver 340A may be temporarily replaced by a clock source 360A, in which case sub-tree 350A then looks like a conventional clock tree. It can be analyzed and designed using conventional clock tree techniques. If the results are acceptable, the temporary clock roots 360 are removed, and the process moves on to mesh fabric creation and pre-fabric tree synthesis and optimization.

Figure 4E:
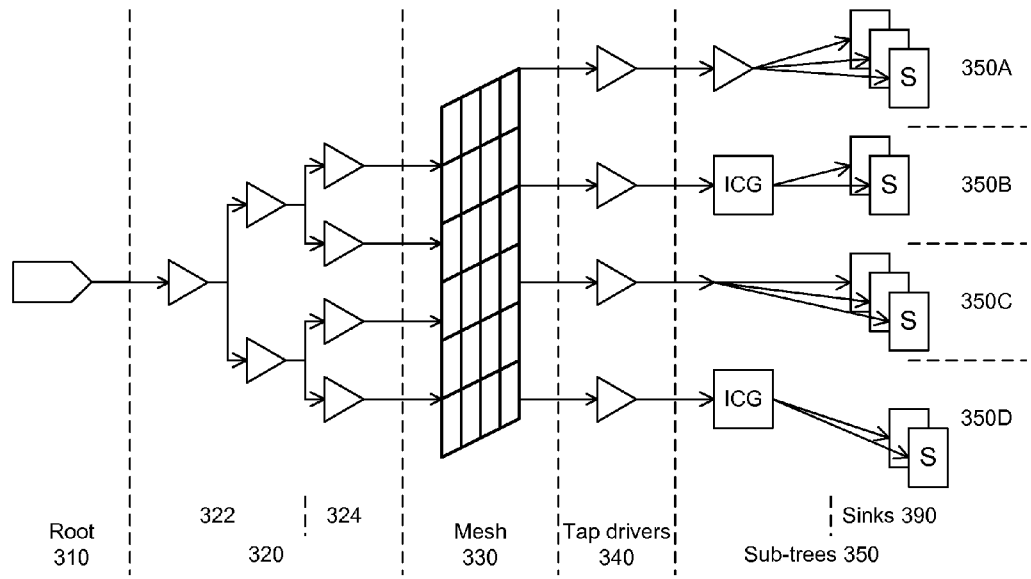

In FIG. 4E, the clock mesh 330 is created, mesh drivers 324 are added, and the mesh is routed. The mesh 330 is analyzed to ensure that it meets quality criteria. The pre-mesh tree 322 is compiled. Finally, the clock nets are routed. This produces the multi-source clock layout shown in FIG. 3.

Utilizing this technique has advantages. Unlike conventional clock meshes, gate levels below the clock fabric are not restricted to only a few levels. Three or more levels can be used. Thus, multisource benefits can be seen with higher numbers of gate levels. Additionally, in this design the clock mesh can be coarser compared to a pure clock mesh approach, resulting in lower power consumption.

Figure 5:
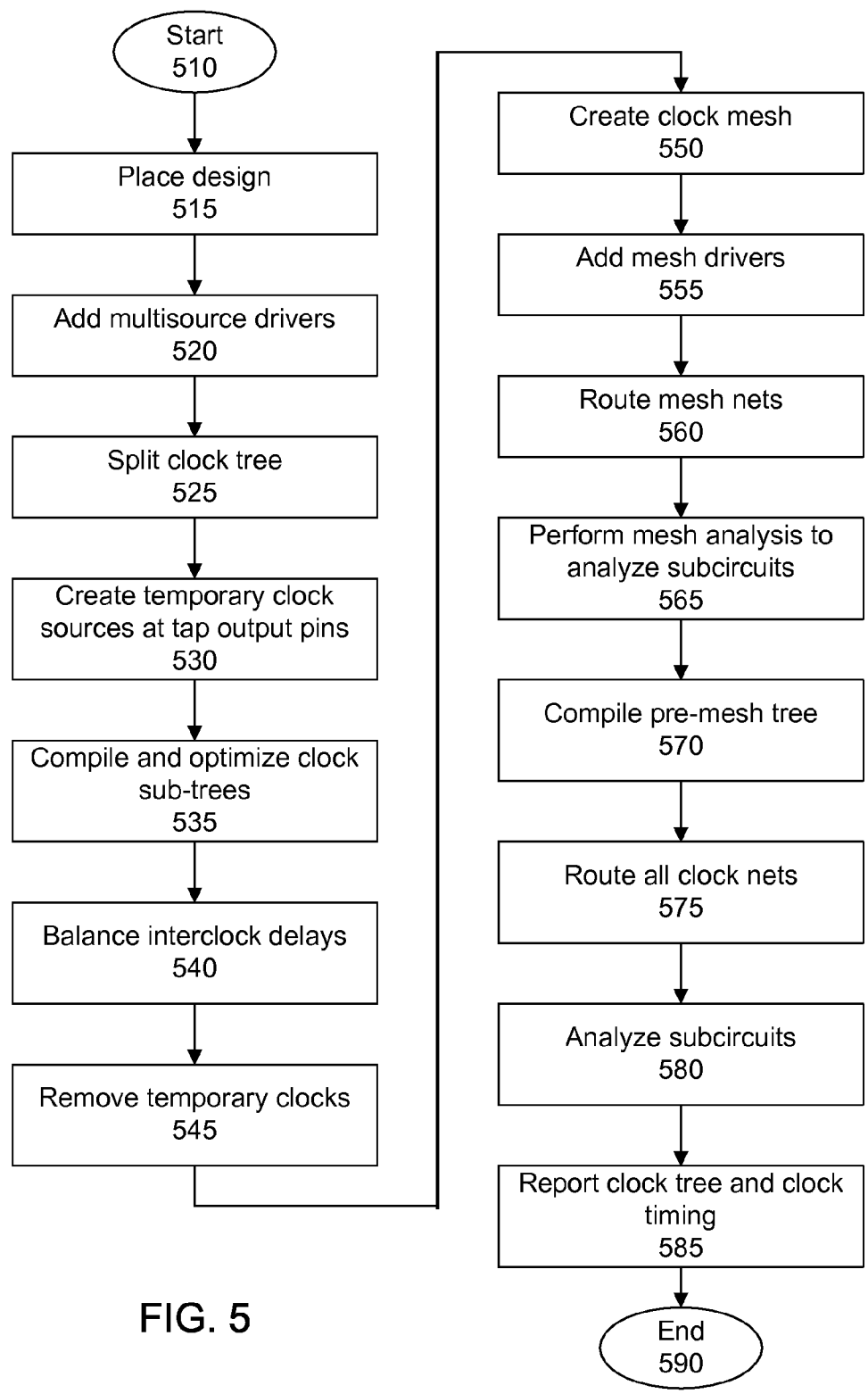
FIG. 5 is a flowchart of one embodiment of generating a multisource clock system.

FIG. 5 is a flowchart illustrating one embodiment of generating a multisource clock system, corresponding to the example of FIG. 4. The process starts at block 510. At block 515, corresponding to FIG. 4A, the initial design is placed. The initial design places the clock root and clock sinks and lays out the rest of the circuit.

At block 520, corresponding to FIG. 4B, multisource drivers (i.e., tap drivers) are initially placed.

At block 525, corresponding to FIG. 4C, the clock tree is split into sub-trees. The sub-trees are assigned to multisource drivers. The multisource drivers eventually will tap into the mesh fabric at a limited number of tap locations. In one embodiment, these locations are automatically selected, as described below.

Blocks 530-545 correspond to FIG. 4D. At block 530, temporary clocks are created at the multisource driver output pins. These clocks are used for optimization, and removed later. At block 535, the clock sub-trees are compiled and optimized. The optimization may result in certain sinks being moved to different tap drivers (as shown in FIG. 4C). At block 540, the design tool balances the interclock delays. This ensures that the timing of the final circuit will be accurate, with balanced delays. At block 545, the temporary clocks at the multisource driver output pins are removed. The tap drivers will receive their clocks through the clock fabric so the temporary clocks, which are used for optimization and balancing, are not needed in the final circuit design.

Blocks 550-585 correspond to FIG. 4E. At block 550, the clock mesh is created. The clock mesh is created between the clock root 310 and the multisource drivers 340. At block 555, the mesh drivers 324 are added. The mesh drivers 324 are added before the clock mesh and are used to drive the clock signal within the clock mesh. At block 560, the mesh nets are routed. The routing depends on the signal needs at the sinks.

At block 565, a mesh analysis is performed to analyze sub-circuits. At block 570, the pre-mesh tree 322 is compiled. The pre-mesh tree 322 is between the clock root 310 and the mesh drivers 324. At block 575, all clock nets are routed. At block 580, the subcircuits are analyzed. The subcircuit analysis provides information about the clock timing, through the entire multisource clock system. At block 585, in one embodiment, the hybrid clock distribution system and clock timing are reported. The report may include full data. Alternately, the report may indicate only whether the timing meets requirements.

FIGS. 4 and 5 are just one example. The process of creating a hybrid clock distribution system includes many tasks, each of which can be accomplished in different ways and the order of which can also be changed. One task is generating and placing the set of tap drivers that connect the distribution fabric to the sub-distribution networks. This preferably is done automatically. In one approach, a design tool (typically implemented as software on a computer system) accesses information about the sub-distribution networks (including possibly about the clock sinks). It may also access information about the distribution fabric (and/or about the clock root). Based on this information, the design tool generates and places the set of tap drivers. This could include determining the number of tap drivers, the placement of the tap drivers, the connections of the tap drivers to the distribution fabric, and the connections of the tap drivers to the sinks via the sub-distribution networks.

These sub-tasks can be performed in different orders. In the example of FIGS. 4 and 5, the set of tap drivers are first generated and placed (even before the clock mesh exists). Then they are connected to the sub-trees in connection with the sub-tree design. Then they are connected to the clock mesh in connection with the clock mesh design. In an alternate approach, the clock mesh and sub-trees could be generated and designed first. The set of tap drivers is then generated, placed and connected to the existing clock mesh and sub-trees.

The generation and placement of tap drivers can be performed concurrently with other tasks, such as the design of the distribution fabric, the design of the sub-distribution networks, the selection of tap points on the distribution fabric, and the assignment of which tap drivers couple to which sinks. The processes can also be done iteratively. For example, an initial set of tap drivers can be generated and placed based on partial or incomplete information about the rest of the hybrid clock distribution system. This can then be iterated as the design of the distribution fabric or of the sub-distribution networks are iterated.

In order to generate a good set of tap drivers, it is useful to evaluate the effectiveness of candidate configurations. In one embodiment, the design system generates candidate sets of tap driver locations, and then applies some conventional clock tree synthesis engine metrics to evaluate the quality of results (e.g. latency, area, power, etc.) to estimate the suitability of the tap configuration. If, after evaluation, the metrics for the candidate tap locations are within the desired range, the process stops. If they are not, in one embodiment, the set of locations is adjusted, the drivers are adjusted, and/or sinks may be shifted from one tap to another. The clock distribution system is then reevaluated.

In one embodiment, adjustments may include splitting a single driver into multiple drivers to reduce latency to various taps, or consolidating multiple drivers into a single driver to reduce the number of taps and hence the overhead. In addition, in one embodiment, the locations of tap drivers may be adjusted to improve metrics, or to comply with user constraints. For example, most chip architectures would require that the tap drivers be located under, or very near, the clock fabric that drives them.

Figure 6:
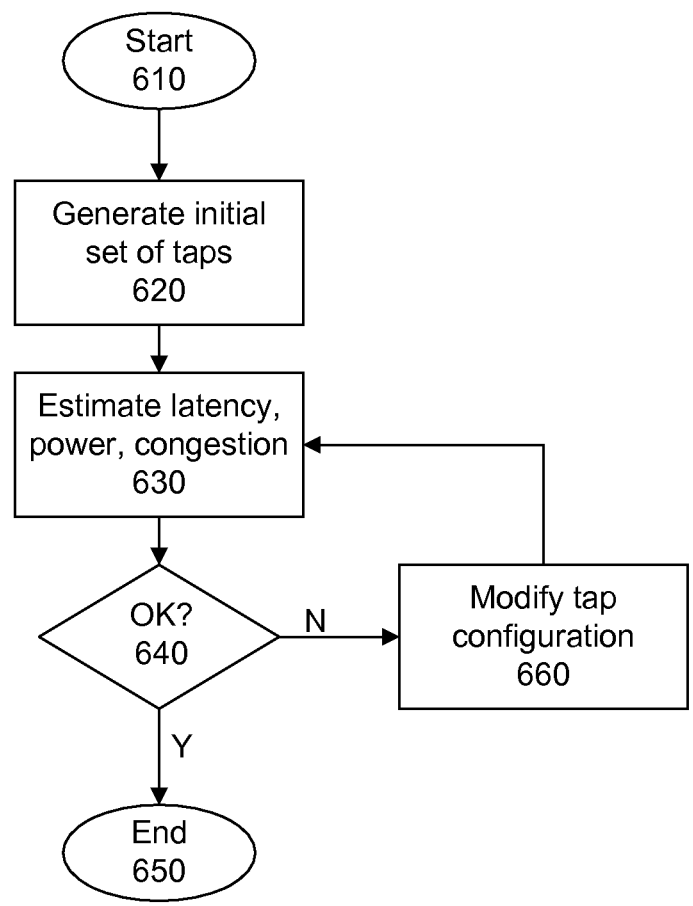
FIG. 6 is a flowchart of one embodiment of automatic tap placement and optimization.

FIG. 6 is a flowchart of one embodiment of automatically placing tap drivers and optimizing tap placement. The process starts at block 610. At block 620, an initial semi-random set of tap drivers is generated. The generation 620 is not fully random because the placement of tap drivers reflects the location and number of sinks in the design. In one embodiment, the initial placement of tap drivers is based on the estimated locations of those sinks which will be driven by that tap driver.

At block 630, latency, power, and congestion values for the initial set of tap drivers is estimated. Other quality of result metrics may be used. In one embodiment, this is done using conventional clock tree synthesis (CTS) tools. At block 640, the process determines whether the values are acceptable for the circuit being designed. If so, the process ends at block 650.

If not, at block 660, the set of tap drivers is iterated. In one embodiment, standard iterative CTS transformations are used to modify the set of tap drivers. Examples include moving tap drivers, reassigning which tap drivers drive which sinks, adding or removing tap drivers, and splitting or combining tap drivers. The process then returns to block 630, to estimate the latency, power, and congestion values for the updated configuration. This process can be iteratively executed until the values meet the preset thresholds. Alternatively, the tap locations may be optimized using a different methodology. In one embodiment, the initial automatic assignment based on sink location is followed by an evaluation step and potential reconfiguration.

Figure 7:
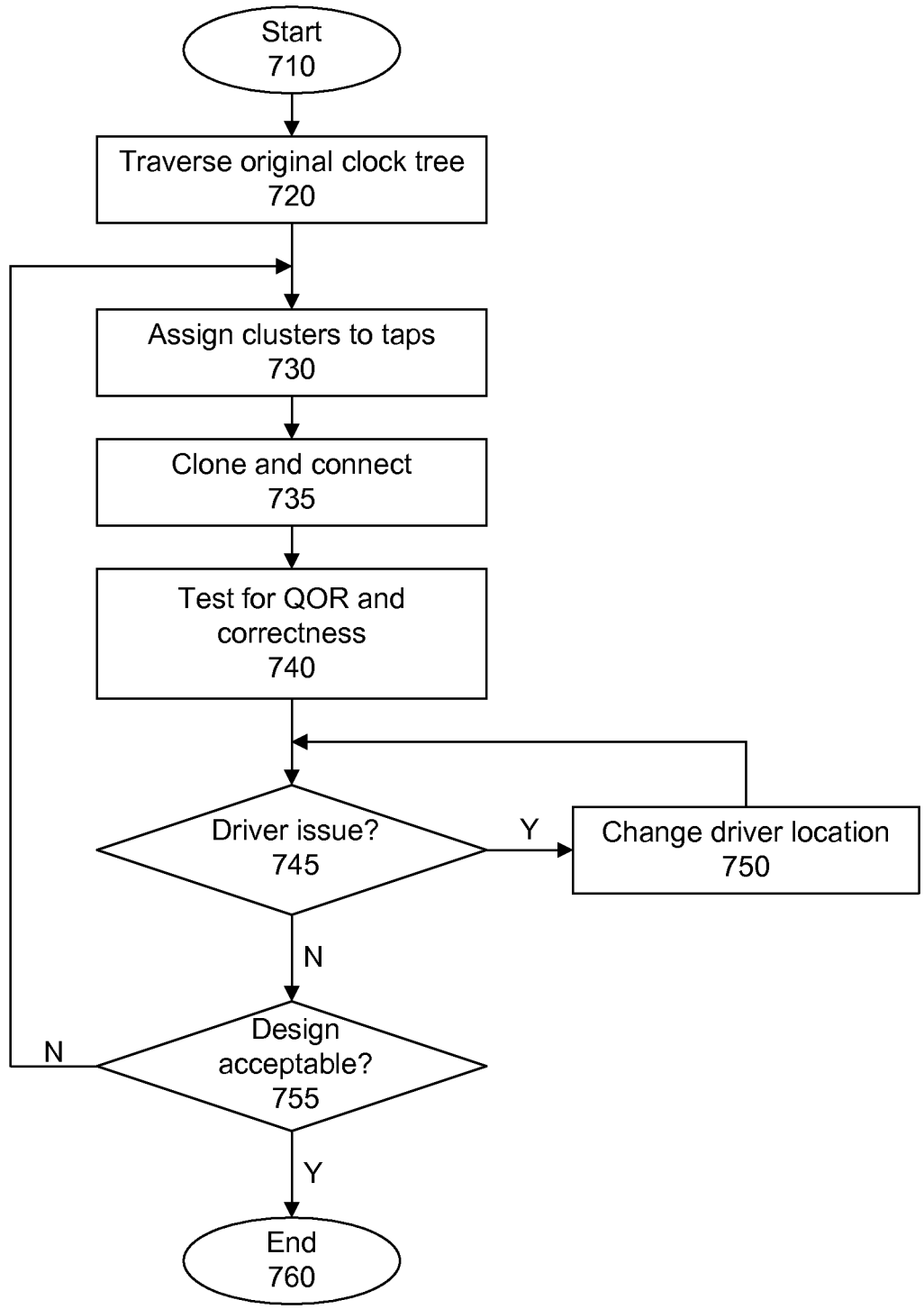
FIG. 7 is a flowchart of one embodiment of tap assignment.

FIG. 7 is a flowchart of one embodiment of tap assignment, the process of determining which tap drivers drive which sinks. The process starts at block 710. At block 720, the process traverses the original clock tree (e.g., FIG. 4A) to identify the sink nets and sink pins. This can be done recursively starting from the original root. The process stops when a traditional sink pin (e.g., a register clock input pin) or a pin with a CTS exception is reached. In one embodiment, any of these exceptions will stop traversal and clock gates below these exceptions will not be cloned: float pins, stop pins, non-stop pins, and exclude pins. The term "sink pin" will be used to include CTS exceptions as well as traditional sink pins.

At block 730, the process assigns sinks to tap drivers. In most cases, sinks will be assigned to the closest tap driver. "Closest" can be defined in different ways: according to physical distance, according to effective route length, according to propagation delay, etc. Other factors can also be considered in making assignments. For example, the design system may take into consideration balancing the loads on taps. The design system could also calculate the trade-off between distance to tap driver and delay. In one embodiment, the assignment criteria, in addition to distance and delay, may include reducing the overhead of enable signals. When a tap driver has a few sinks that are gated by a particular enable signal, and those sinks are close to an adjoining region that uses the same enable signal, it can be more efficient to shift the sinks, thereby eliminating a dependency on that enable signal.

At block 735, after assignment, the relevant parts of the clock gating circuitry are cloned from the original ("model") clock tree and connected to the assigned tap driver. The process also connects the enable pins (or other side input pins).

After the design process is completed, it is useful to validate/test the circuit design. There are two aspects of testing: correctness and quality of result (QOR). In one embodiment, testing uses non-mesh designs to unit-test various capabilities where doing so does not degrade coverage.

At block 745, the process determines whether there are issues with the tap drivers. If there are issues, at block 750 the issues are corrected. For example, if illegal driver placements are specified, the design tool might pick a "nearby" legal location using the detailed placement engine. If no driver type is specified, the tool might pick a driver that is legal for the specified clock tree.

At block 755, the process determines whether the design has generated correct logic that is logically equivalent to the original tree. At block 755, the process tests for errors such as sinks driven by tap drivers that are further than the closest two tap drivers, lost sink pins, and bad logic.

Figure 8:
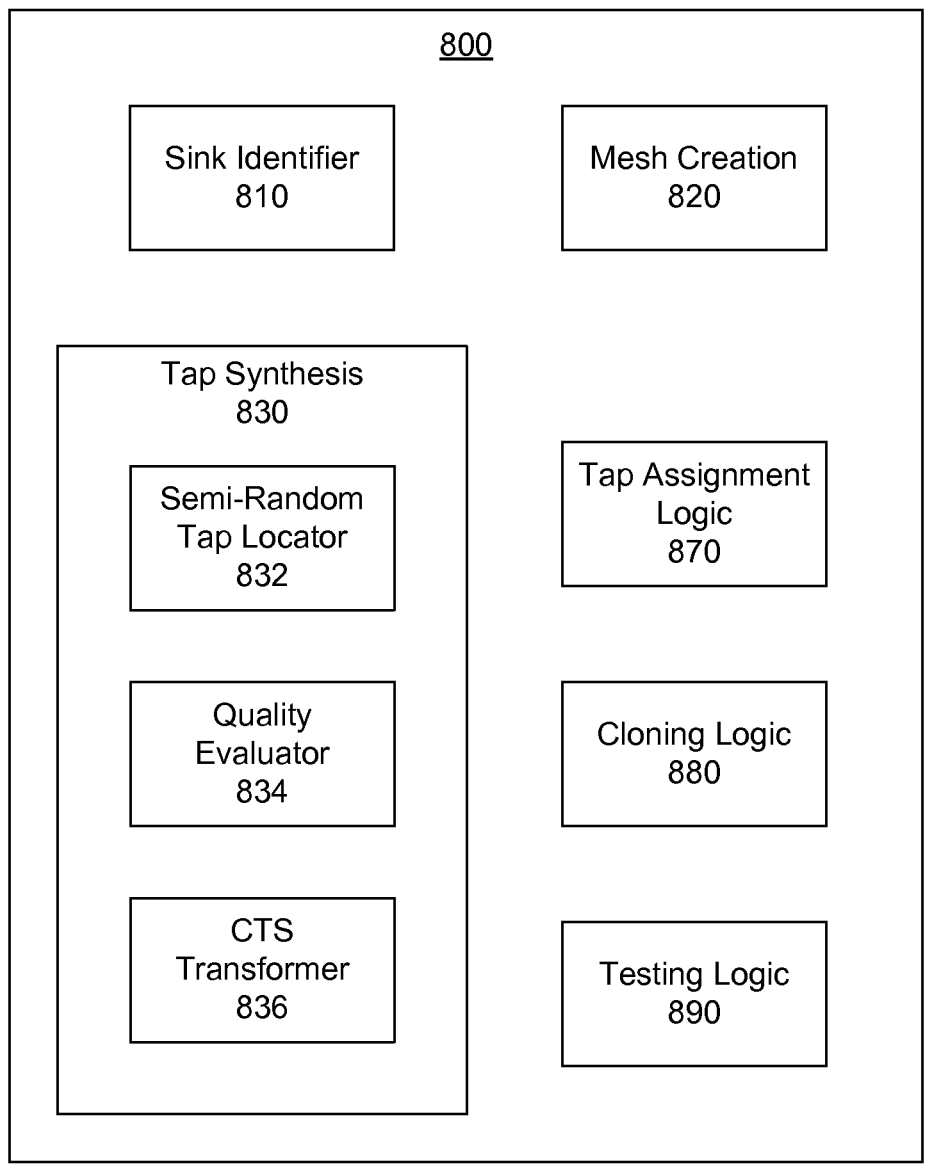
FIG. 8 is a block diagram of one embodiment of a design system enabling the multi-source clock tree generation.

FIG. 8 is a block diagram of one embodiment of a computer-implemented design tool 800 enabling multi-source clock tree generation. The different modules 810-890 typically are implemented as software modules running on a computer system, such as the one shown in FIG. 1. The design tool includes a sink identification module 810. In one embodiment, the sink nets and sink pins are identified in the original clock tree.

The mesh specification module 820 allows specification and creation of the mesh.

Module 830 implements tap synthesis, i.e., synthesis of the tap drivers. In current technology, tap synthesis is done manually. Here, module 830 automatically synthesizes the tap drivers. FIG. 8 shows one possible implementation of the tap synthesis module 830. In this example, tap drivers are initially placed based on an initial semi-random tap driver locator 832. In one embodiment, the semi-random tap driver locator uses clusters of sinks to determine approximate placements for the tap drivers. In one embodiment, the semi-random tap driver locator 832 uses a distribution based on expected layout, based on historical data. Other methods of selecting the initial locations may be used. These initial locations are evaluated by quality evaluator 834. If they do not meet the requirements, CTS transformer 836 shifts the placement of tap drivers as needed, until the required criteria are met.

In an alternate approach, the tap synthesis module 830 may simply create a grid of tap drivers. For example, the tap synthesis module 830 could just spread out the tap drivers uniformly in a 4×8 grid, and then evaluate it. If not good enough, it might be revised to a 5×8 grid, etc.

Tap driver assignment logic 870 assigns tap drivers to sinks. In one approach, sinks are clustered in a low level cluster, for example by using an conventional CTS clustering engine. The clustering can be performed in iterations. In one embodiment, the clusters are restricted to coordinates forming a grid. This is more compatible with architectures where the tap drivers have to be located directly under (or near) a coarse clock mesh. If the sinks are clustered, then the tap driver assignment logic 870 may assign tap drivers based on the clusters.

Note that tap assignment 870 and tap synthesis 830 can be done separately, but tap assignment may be included as part of the tap synthesis process, for example in order to evaluate the QOR.

Cloning logic 880 clones the relevant parts of the clock gating circuitry, and connects them to the assigned tap point. Testing logic 890 ensures that the resulting design meets the quality criteria.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of generating a clock distribution system for a circuit design, the clock distribution system connecting a clock root to a plurality of clock sinks, the clock distribution system including a distribution fabric connected by a set of tap drivers to a plurality of sub-distribution networks, the method comprising a computer system performing the steps of:
   accessing information about the distribution fabric and the sub-distribution networks, wherein the sub-distribution networks contain clock gating logic;
   based on the information about both the distribution fabric and the sub-distribution networks, generating and placing a set of tap drivers for connecting the distribution fabric to the plurality of sub-distribution networks; and
   receiving user constraints on the set of tap drivers, wherein the step of generating and placing a set of tap drivers is performed subject to the user constraints.

2. The method of claim 1 wherein the distribution fabric is a mesh of conductors.

3. The method of claim 1 wherein the sub-distribution networks are trees.

4. The method of claim 1 wherein the distribution fabric exhibits low skew relative to an overall latency of the circuit design for all corners and modes of the circuit design.

5. The method of claim 1 wherein at least one of the sub-distribution networks is an unbalanced tree.

6. The method of claim 1 wherein the clock gating logic includes integrated clock gating.

7. The method of claim 1 wherein the step of generating and placing a set of tap drivers is based on a placement of the sinks.

8. The method of claim 7 wherein the step of generating and placing a set of tap drivers comprises:
   clustering the sinks based on their placement; and
   generating and placing the tap drivers based on the clusters of sinks.

9. The method of claim 8 further comprising:
   traversing an original clock tree recursively to identify the sinks.

10. The method of claim 1 wherein the step of generating and placing a set of tap drivers is based on a placement of the sub-distribution networks.

11. The method of claim 1 wherein the step of generating and placing a set of tap drivers is based on a quality of result objective for the circuit design.

12. The method of claim 11 wherein the quality of result objective includes one or more of: balancing loads for the sinks, reducing latency of the clock signal to the sinks, and balancing load on the distribution fabric.

13. The method of claim 1 wherein the user constraints include one or more of: limitations on the number of tap drivers, area limitations, power limitations, and timing limitations.

14. The method of claim 1 further comprising the computer system performing the steps of:
   assigning which tap drivers connect the distribution fabric to which sub-distribution networks.

15. The method of claim 14 wherein the step of assigning which tap drivers connect the distribution fabric to which sub-distribution networks, occurs after a step of placing the set of tap drivers.

16. The method of claim 14 wherein the step of assigning which tap drivers connect the distribution fabric to which sub-distribution networks, occurs before a step of placing the set of tap drivers.

17. The method of claim 14 wherein the step of assigning which tap drivers connect the distribution fabric to which sub-distribution networks, occurs concurrently with a step of placing the set of tap drivers.

18. A method of generating a clock distribution system for a circuit design, the clock distribution system connecting a clock root to a plurality of clock sinks, the clock distribution system including a distribution fabric connected by a set of tap drivers to a plurality of sub-distribution networks, the method comprising a computer system performing the steps of:
   accessing information about the distribution fabric and the sub-distribution networks, wherein the sub-distribution networks contain clock gating logic; and
   based on the information about both the distribution fabric and the sub-distribution networks, generating and placing a set of tap drivers for connecting the distribution fabric to the plurality of sub-distribution networks;
   wherein the distribution fabric spans a physical distance that is larger than a correlation distance for on-chip process variations.

19. The method of claim 18 wherein the distribution fabric has a physical layout that reduces an effect of on-chip process variations for the circuit design.

20. The method of claim 19 wherein the clock distribution system further comprises a plurality of drivers connected in parallel to drive the distribution fabric.

21. The method of claim 18 wherein the distribution fabric is a mesh of conductors.

22. The method of claim 18 wherein the sub-distribution networks are trees.

23. The method of claim 18 wherein the distribution fabric exhibits low skew relative to an overall latency of the circuit design for all corners and modes of the circuit design.

24. The method of claim 18 wherein at least one of the sub-distribution networks is an unbalanced tree.

25. A non-transitory machine-readable storage medium having stored thereon data representing sequences of instructions, which when executed by a computer system, cause the computer system to perform a method of generating a clock distribution system for a circuit design, the clock distribution system connecting a clock root to a plurality of clock sinks, the clock distribution system including a distribution fabric connected by a set of tap drivers to a plurality of sub-distribution networks, the method comprising:
   accessing information about the distribution fabric and the sub-distribution networks, wherein the sub-distribution networks contain clock gating logic;
   based on the information about both the distribution fabric and the sub-distribution networks, generating and placing a set of tap drivers for connecting the distribution fabric to the plurality of sub-distribution networks; and
   assigning which tap drivers connect the distribution fabric to which sub-distribution networks.

26. The non-transitory machine-readable storage medium of claim 25 wherein the distribution fabric is a mesh of conductors.

27. The non-transitory machine-readable storage medium of claim 25 wherein the sub-distribution networks are trees.

28. The non-transitory machine-readable storage medium of claim 25 wherein the clock distribution system further comprises a plurality of drivers connected in parallel to drive the distribution fabric.

29. The non-transitory machine-readable storage medium of claim 25 wherein at least one of the sub-distribution networks is an unbalanced tree.

30. The non-transitory machine-readable storage medium of claim 25 wherein the clock gating logic includes integrated clock gating.

31. The non-transitory machine-readable storage medium of claim 25 wherein generating and placing the set of tap drivers is based on a placement of the sinks.

32. The non-transitory machine-readable storage medium of claim 31 wherein generating and placing the set of tap drivers comprises:
   clustering the sinks based on their placement; and
   generating and placing the tap drivers based on the clusters of sinks.

33. The non-transitory machine-readable storage medium of claim 25 wherein the method further comprises:
   traversing an original clock tree recursively to identify the sinks.

34. The non-transitory machine-readable storage medium of claim 25 wherein generating and placing the set of tap drivers is based on a placement of the sub-distribution networks.

35. The non-transitory machine-readable storage medium of claim 25 wherein generating and placing the set of tap drivers is based on a quality of result objective for the circuit design.

36. The non-transitory machine-readable storage medium of claim 35 wherein the quality of result objective includes one or more of: balancing loads for the sinks, reducing latency of the clock signal to the sinks, and balancing load on the distribution fabric.

37. The non-transitory machine-readable storage medium of claim 25 wherein assigning which tap drivers connect the distribution fabric to which sub-distribution networks, occurs after placing the set of tap drivers.

38. The non-transitory machine-readable storage medium of claim 25 wherein assigning which tap drivers connect the distribution fabric to which sub-distribution networks, occurs before placing the set of tap drivers.

39. The non-transitory machine-readable storage medium of claim 25 wherein assigning which tap drivers connect the distribution fabric to which sub-distribution networks, occurs concurrently with placing the set of tap drivers.

40. A non-transitory machine-readable storage medium having stored thereon data representing sequences of instructions, which when executed by a computer system, cause the computer system to perform a method of generating a clock distribution system for a circuit design, the clock distribution system connecting a clock root to a plurality of clock sinks, the clock distribution system including a distribution fabric connected by a set of tap drivers to a plurality of sub-distribution networks, the method comprising:
   accessing information about the distribution fabric and the sub-distribution networks, wherein the sub-distribution networks contain clock gating logic;
   based on the information about both the distribution fabric and the sub-distribution networks, generating and placing a set of tap drivers for connecting the distribution fabric to the plurality of sub-distribution networks; and
   wherein generating and placing the set of tap drivers is performed subject to user constraints on the set of tap drivers.

41. The non-transitory machine-readable storage medium of claim 40 wherein the user constraints include one or more of: limitations on the number of tap drivers, area limitations, power limitations, and timing limitations.

42. The non-transitory machine-readable storage medium of claim 40 wherein the distribution fabric is a mesh of conductors.

43. The non-transitory machine-readable storage medium of claim 40 wherein the sub-distribution networks are trees.

44. The non-transitory machine-readable storage medium of claim 40 wherein wherein at least one of the sub-distribution networks is an unbalanced tree.

\* \* \* \* \*